United States Patent [19]

Tokoro et al.

[11] Patent Number: 5,771,072
[45] Date of Patent: Jun. 23, 1998

[54] VIDEO SIGNAL PROCESSING APPARATUS AND SYNTHESIZED-PICTURE PROJECTING APPARATUS FOR SYNTHESIZING A PLURALITY OF VIDEO SIGNALS

[75] Inventors: Tomio Tokoro; Masaaki Mitani, both of Tokyo, Japan

[73] Assignees: Sony Corporation; Chromatek Inc., both of Tokyo, Japan

[21] Appl. No.: 634,357

[22] Filed: Apr. 18, 1996

[30] Foreign Application Priority Data

Apr. 21, 1995 [JP] Japan .................................. 7-119048

[51] Int. Cl.$^6$ .............................................. H04N 5/66
[52] U.S. Cl. ........................................ 348/383; 348/747
[58] Field of Search ................................. 348/607, 744, 348/383, 747, 511, 36

[56] References Cited

U.S. PATENT DOCUMENTS 4,974,073  11/1990  Inova .
5,136,390   8/1992  Inova et al. .
5,574,508  11/1996  Diamant .................................. 348/511

FOREIGN PATENT DOCUMENTS

WO-A-92
08319   5/1992  WIPO .

OTHER PUBLICATIONS

Patent Abstracts of Japan, vol. 014, No. 537 (E-1006). Nov. 27, 1990 & JP-A-02 228180 (Hitachi Denshi Ltd), Sep. 11, 1990.

*Primary Examiner*—Victor R. Kostak
*Attorney, Agent, or Firm*—Frommer Lawrence & Haug LLP; William S. Frommer

[57] ABSTRACT

A video signal processing apparatus includes synchronizing signal separation (31) for extracting a synchronization information of an input video signal, a reference clock signal source (32) for generating a signal having a constant period, phase synchronization control (33) which receives input with a clock signal output from the reference clock signal source and which outputs a phase-locked clock signal at a timing of outputting the synchronization information, and a memory (35) for storing a correction data used for correcting a video signal of one scanning line amount. The correction data is read out from the memory (35) based on the clock signal to process the input video signal. When a synthesized picture is projected, the correction data is a data which permits a luminance level of the video signal of each scanning line amount to be faded in and/or faded out at a start portion and/or an end portion thereof linearly or like a predetermined curve.

3 Claims, 8 Drawing Sheets

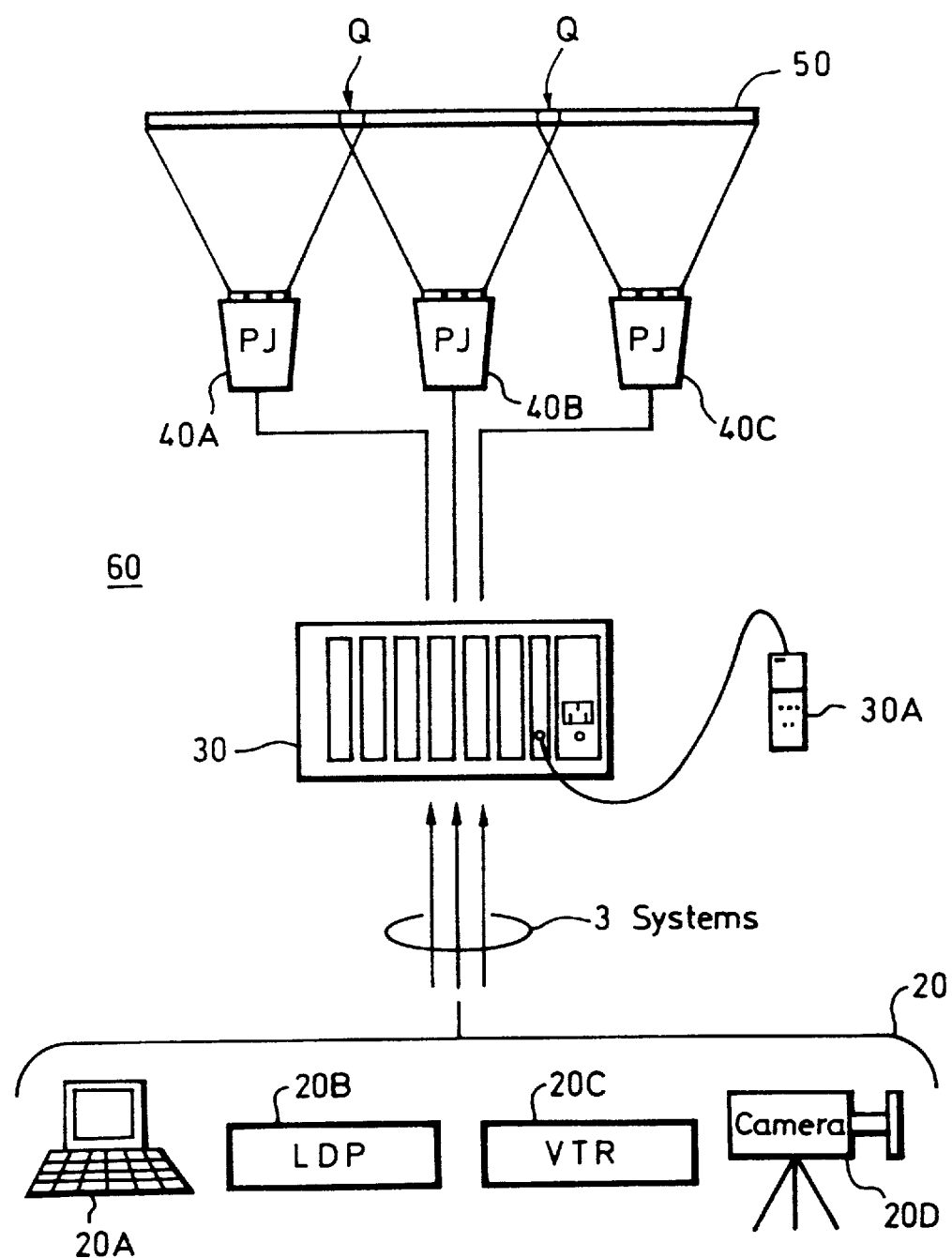

VIDEO SIGNAL PROCESSING APPARATUS AND SYNTHESIZED-PICTURE PROJECTING APPARATUS FOR SYNTHESIZING A PLURALITY OF VIDEO SIGNALS

BACKGROUND OF THE INVENTION

1. Field of the Invention

The present invention relates to a video signal processing apparatus, and more particularly to a video signal processing apparatus and a synthesized-picture projecting apparatus which are useful when a large-size picture is formed by synthesizing two video signals or more.

2. Description of the Related Art

A display apparatus, such as a television receiver, a monitor apparatus of a computer or the like, for displaying a picture on a tube surface of a cathode-ray tube, a liquid crystal display or the like has been usually used to visually display various kinds of informations. However, a limited size of a display screen of such display apparats prevents a user from watching a picture which he really wants to watch.

On the other hand, while a projector employing a projecting tube or a liquid crystal plate can reproduce a picture on a large part of eyesight by projecting the picture on a large-size screen, it is generally difficult for such large-size projecting apparatus to reproduce a bright picture as its display screen is larger.

Therefore, a so-called multi-vision type picture projecting apparatus for synthesizing pictures projected by small-size projecting apparatus to project a synthesized picture on a large-size screen is used to reproduce a picture used for producing virtual reality in a simulation apparatus, an amusement theater or the like.

FIG. 1 schematically shows a projecting apparatus in which a plurality of small-size projecting apparatus (liquid crystal projectors) are disposed to form a large-size synthesized picture on a screen. Reference numeral 5 depicts the whole synthesized-picture display apparatus.

A transmission type screen 6 is divided into four screen portions 6a to 6d. Liquid crystal plates 1 to 4 are provided so as to correspond to the respective screen portions 6a to 6d. Rays of light are radiated on the liquid crystal plate 1 to 4, thereby pictures $LA_1$, to $LA_4$ being projected on the screen 6.

Optical systems 7 to 10 each have the same arrangement. The optical system 7, for example, includes a light source 11, a condenser lens 12, a relay lens 13 and a field lens 14. Rays of light emitted from the light source 11 are condensed by the condenser lens 12 and the relay lens 13 onto the liquid crystal plate 1. The liquid crystal plate 1 is energized in response to a supplied video signal to thereby modulate the transmission light therethrough. The transmitted light thus modulated is projected through the field lens 14 onto the screen 6a.

Similarly, in each of other optical systems 8, 9 and 10, rays of light which represent a picture and are transmitted through liquid crystal plates 2, 3 and 4 are respectively projected on the quartered regions 6b, 6c, 6d of the screen 6. Therefore, a synthesized picture is formed on the screen 6, which can provide a large-size picture display apparatus.

However, such projection-type synthesized-picture projecting apparatus produces a discontinuous line of the picture at a portion where each of the projected picture is adjacent to another projected picture. It is very difficult to position the respective optical systems 7 to 10 for removing such discontinuous lines.

For this end, as shown in FIG. 2A, the above projecting apparatus projects the picture on the screen so that boundaries between adjacent picture portions $LA_1$, to $LA_4$ to be synthesized on the screen 6 should be overlapped to prevent a synthesized picture projected on the screen 6 from having any clearance therein. Further, the above projecting apparatus adjusts a luminance level of one of video signals for pictures projected on an overlapped region Q. FIG. 2B schematically shows respective luminance levels at the picture portions $LA_1$, and $LA_2$, for example. The projecting apparatus carries out a signal processing so that, as shown in FIG. 2B, a luminance level at the picture portion $LA_1$ should be gently lowered from a point a and a luminance level at the picture portion $LA_2$ should be gently increased toward a point b from its rising point.

However, both of the video signals for the pictures to be synthesized need to be processed as described above based on synchronizing signals included in the video signals. Therefore, it is considered that, for example, data for correcting luminance levels of the video signals are stored in a memory or the like to process the video signals based on the data read out from the memory with reference to the synchronizing signals such that the luminance levels of the video signals for the pictures to be synthesized are changed. However, in this case, if different horizontal synchronizing signals of the video signals for pictures to be displayed are input, then it is necessary to change clock signals used for reading correction data depending upon kinds of the video sources, which complicates a correction circuit.

It can be considered that a phase-locked loop (PLL) circuit controlled based on the horizontal synchronizing signal generates a clock signal and a frequency of the output clock signal is divided to generate such clock signals used for reading the correction data from the memory. However, if a jitter is produced in the output signal from the PLL circuit, then a picture quality is lowered and a pass characteristic of a filter for smoothing a read-out digital data needs to be switched whenever a different horizontal frequency of a video signal from a video source is input.

Therefore, even if the above projecting apparatus for projecting the synthesized picture project the same pictures on the boundary portions of the projected pictures, then it is very difficult for the projecting apparatus to carry out fade-in and fade-out processings which cancel discontinuity of the adjacent projected pictures at the overlapped portion Q. Moreover, since adjustment works for the above processings and a circuit arrangement therefor become complicated, it is difficult to easily set the projected pictures as one continuous picture at the boundary portion.

In particular, when the systems (horizontal and vertical frequencies) of video signals from the video sources are different from each other, a signal processing circuit for processing the different synchronizing signals becomes complicated.

SUMMARY OF THE INVENTION

In view of such aspects, it is an object of the present invention to provide a video signal processing apparatus having a simple arrangement suitable for use in a multiscan type projector and a synthesized-picture projecting apparatus formed of the video signal processing apparatus.

According to a first aspect of the present invention, a video signal processing apparatus includes a synchronizing signal separation means for extracting a synchronization information of an input video signal, a reference clock signal source for generating a signal having a constant period, a phase synchronization control means which is input with a clock signal output from the reference clock signal source and which outputs a phase-locked clock signal at a timing of outputting the synchronization information, and a memory means for storing a correction data used for correcting a video signal of at least one scanning line amount. The correction data is read out from the memory means based on the clock signal output from the phase synchronization control means to process the input video signal.

The correction data is a data used for correcting a signal corresponding to an overlapped portion produced when the pictures obtained from the input video signals are synthesized to form a synthesized picture.

The correction data is a data which permits a luminance level of a video signal of one horizontal scanning line amount to be faded in and/or faded out at a start portion and/or an end portion thereof linearly or like a predetermined curve.

According to a second aspect of the present invention, a synthesized-picture projecting apparatus includes a video signal processing apparatus and at least two projecting apparatus. The video signal processing apparatus includes a synchronizing signal separation means for extracting a synchronization information of an input video signal, a reference clock signal source for generating a signal having a constant period, a phase synchronization control means which is input with a clock signal output from the reference clock signal source and which outputs a phase-locked clock signal at a timing of outputting the synchronization information, a memory means for storing a correction data used for correcting a video signal of at least one scanning line amount, and a control means for reading out the correction data from the memory means based on the clock signal output from the phase synchronization control means and for processing the video signals corresponding to edge portions of projected pictures. The video signal processing apparatus is supplied with two video signals or more for forming a synthesized picture to process the video signals corresponding to an overlapped portion of the synthesized picture. The two projecting apparatus or more project on a screen pictures obtained from video signals output from the video signal processing apparatus.

BRIEF DESCRIPTION OF THE DRAWINGS

FIG. 3 is a schematic diagram showing a synthesized-picture projecting apparatus according to an embodiment of the present invention in a used mode;

DESCRIPTION OF THE PREFERRED EMBODIMENT

Figure 1:
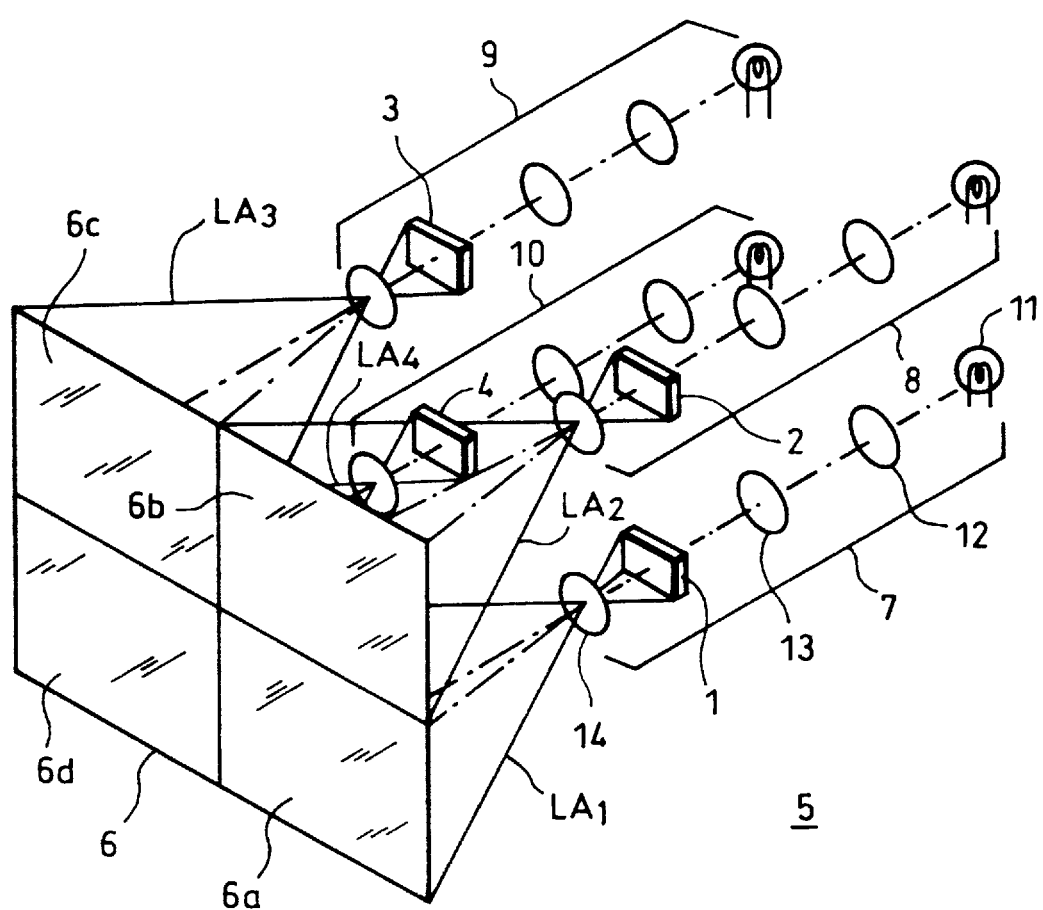
FIG. 1 is a diagram showing an apparatus for projecting a synthesized picture on a screen.
Figure 2A:
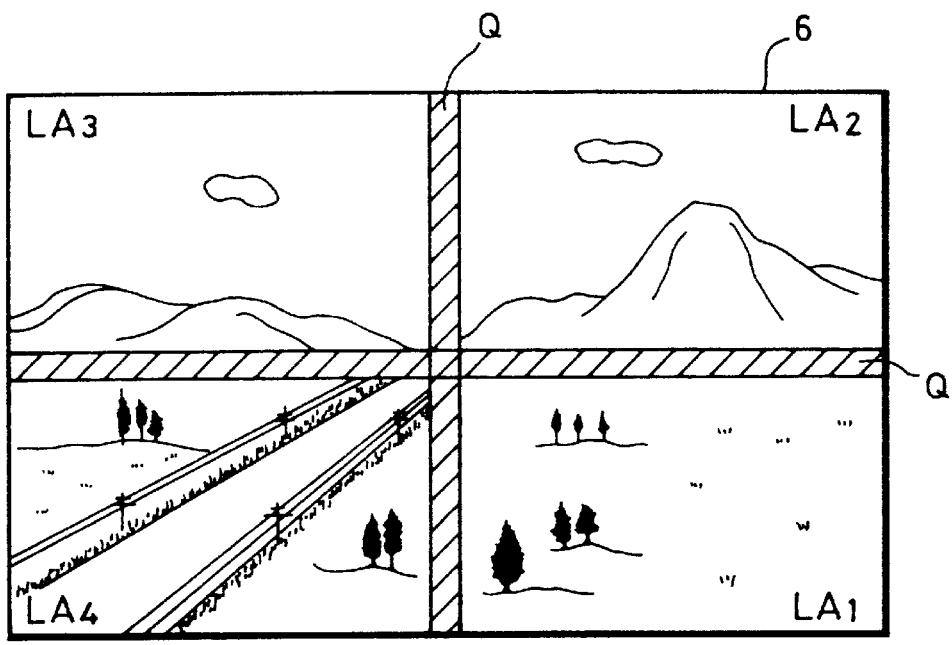
FIG. 2A is diagram showing an overlapped portion of edge portions of quartered synthesized pictures.
Figure 2B:
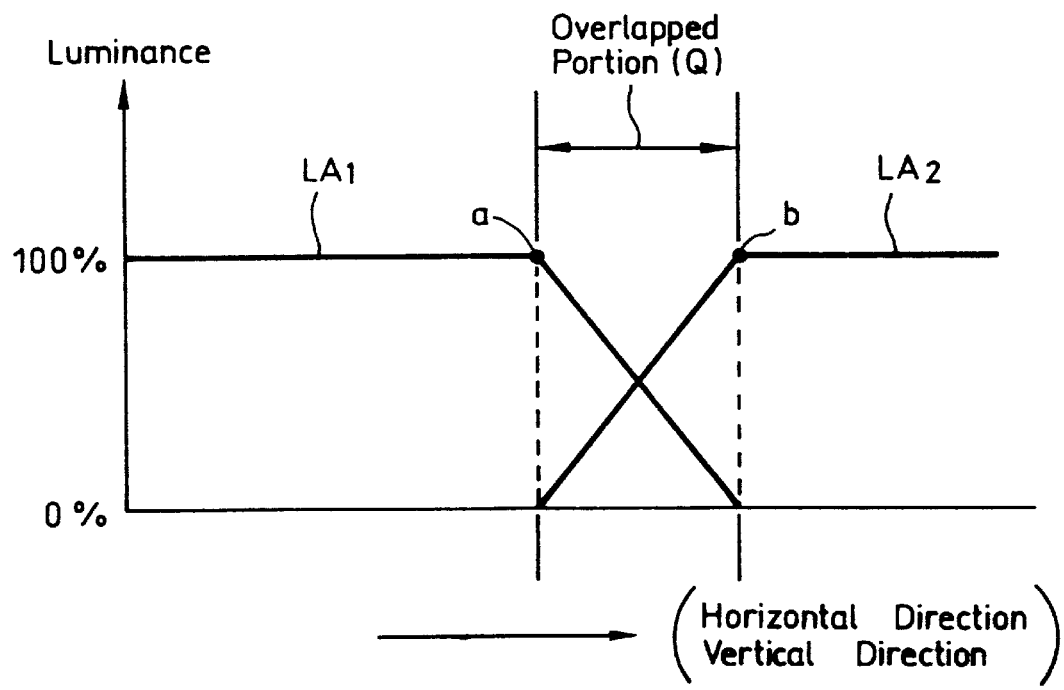
FIG. 2B is a diagram showing a correction characteristic of a video signal.

An outline of a synthesized-picture projecting apparatus employing a video signal processing apparatus according to the present invention will be described with reference to FIG. 3.

As shown in FIG. 3, a video signal source (multi-screen signal source) 20 used for displaying a synthesized picture includes a computer 20A, a laser disk player (LDP) apparatus 20B, a video tape recorder (VTR) 20C and a video camera 20D or the like, for example. The picture signal source 20 outputs, for example, a pictorial information from the computer 20A, a multi-picture data from the laser disk apparatus 20B, a reproduced video signal from the VTR 20C, a video signal obtained by picking up an image of an object and output directly from the video camera 20D, etc. as video sources.

A single video signal output from the VTR 20C, the laser disk player apparatus 20B or the like is once stored in the computer 20A as a picture data. The computer 20A processes the video signal to obtain a plurality of video signals of n channels for multi screens, and outputs them as R, G, B component signals. In this case, synchronization information may be superposed on a G component signal, for example, or the synchronization information may be derived through a dedicated cable line as another signal.

The multi-screen video signal output from the video signal source 20 is preferably supplied as the R, G, B component signals to a soft edge matching apparatus 30 (hereinafter referred to as an SEM apparatus) forming the signal processing apparatus according to the present invention. The SEM apparatus 30 carries out the above signal processing which, when a synthesized picture is projected as described above, makes pictures continuous at a joint portion thereof. Then, the SEM apparatus 30 supplies the signals to three projecting apparatus 40A, 40B, 40C of a synthesized-picture projecting apparatus 60 for respectively projecting pictures on left side of the screen 50, at the center thereof and on the right side thereof.

The three projecting apparatus 40A, 40B, 40C of the synthesized-picture projecting apparatus 60 have high-luminance cathode-ray tubes (CRTS) which have been employed as projectors and which convert the video signals into projected pictures to be projected, thereby the synthesized picture being projected on the rectangular screen 50. The projecting apparatus 40A, 40B, 40C may be formed of liquid crystal projectors. The synthesized-picture projecting apparatus 60 includes the three projecting apparatus 40A, 40B, 40C and the SEM apparatus.

While in this embodiment the three projecting apparatus 40A, 40B, 40C are disposed in the horizontal direction, the present invention is not limited thereto and the signal processing apparatus according to the present invention can be applied to a synthesized-picture projecting apparatus having two projecting apparatus or more. The following embodiment will be described on the assumption that a joint portion in a synthesized picture is processed by using two pictures.

Figure 4:
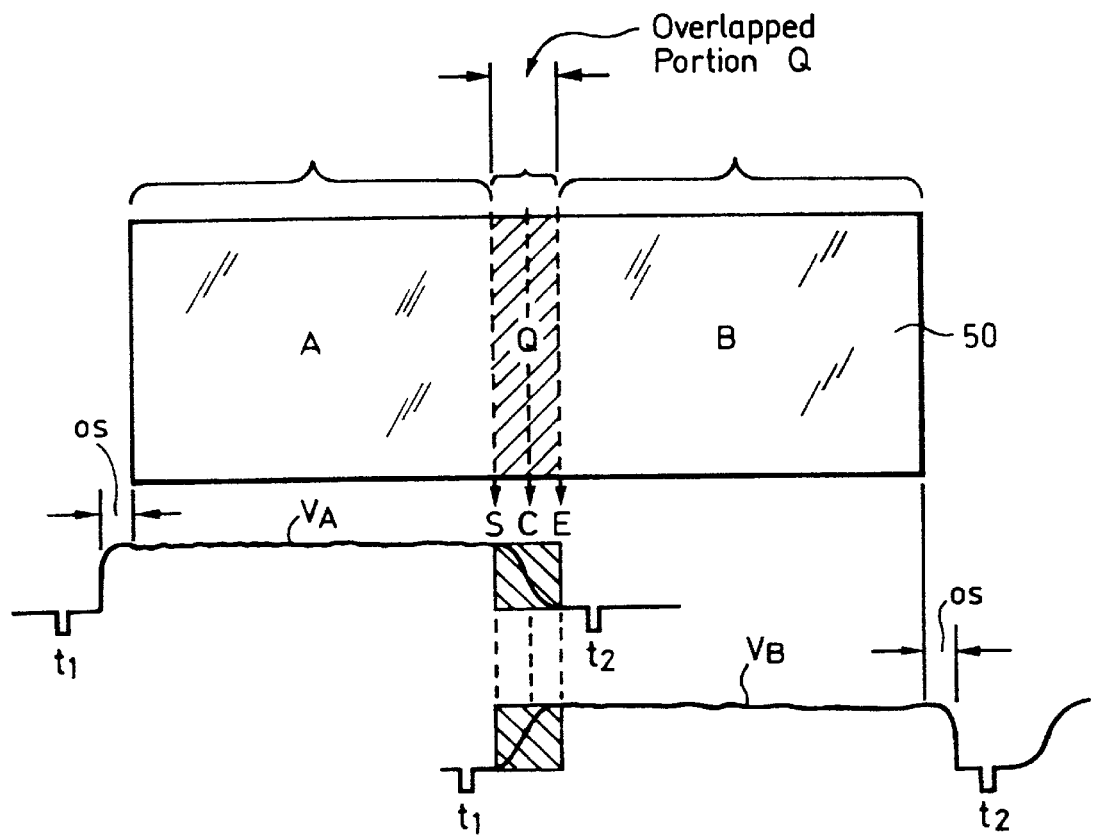
FIG. 4 is a diagram used to explain a synthesized picture projected on a screen.

FIG. 4 is a diagram used to explain a synthesized picture which is obtained by synthesis of two pictures A, B and is to be displayed. FIG. 4 shows how to synthesize the two pictures A, B projected on the screen 50 which has a long length in the horizontal direction.

Edge or boundary portions of the pictures A, B are made as overlapped portions Q where the two pictures are overlapped each other. The signals are processed on the video signal source 20 side so that the overlapped portions Q of the picture A and the picture B should be the same picture.

Specifically, as shown in FIG. 4, a signal in a hatched portion of a video signal $V_A$ slanting down to the right and a signal in a hatched portion of a video signal $V_B$ rising up to the right have the picture informations having the same contents. The video signals $V_A$ and $V_B$ are respectively processed so as to have fade-out and fade-in characteristics in which luminance levels of these portions between the correction start point S and the correction end point E are gradually lowered and increased as shown by curves in FIG. 4.

Accordingly, when the SME apparatus 30 carries out such signal processing and the two projecting apparatus 40A, 40B, for example, project pictures on the screen 50, the luminance at the overlapped portion Q on the screen 50 is set same as that of the picture A and that of the picture B. Therefore, both of the pictures A, B can be synthesized so that a viewer can seldom notice a boundary portion between the pictures A and B.

If the video signal $V_A$ and the video signal $V_B$ are processed so that a left edge of the video signal $V_A$ and a right edge of the video signal $V_B$ should be set as overscanning portions OS, edges of the pictures A, B can be prevented from being displayed at both ends of the screen 50, respectively.

Figure 5:
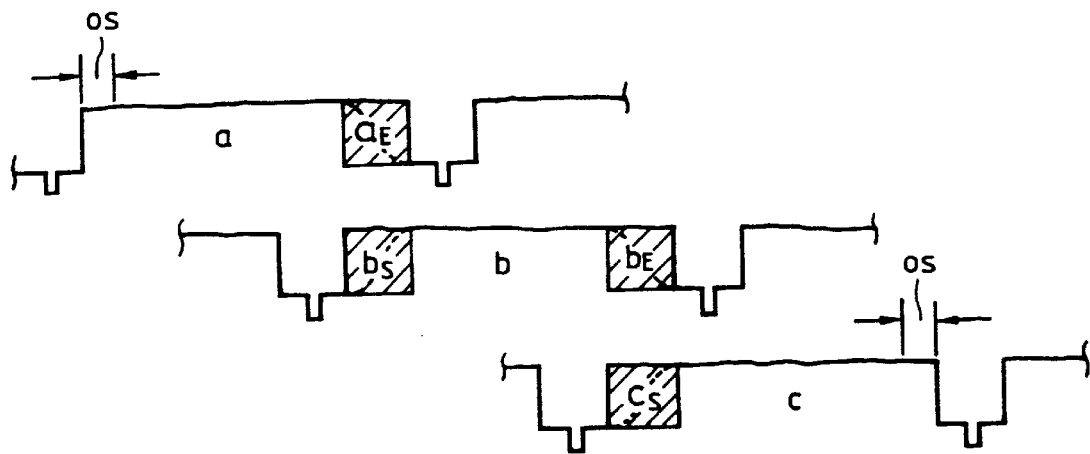
FIG. 5 is a diagram showing a signal waveform used when video signals of three systems are synthesized.

When a synthesized picture is displayed by the three projecting apparatus 40A, 40B, 40C, as shown in FIG. 5, respective video signals a, c (FIG. 5 shows only one horizontal period from $t_1$ to $t_2$ of each of the video signals) for left and right pictures are processed similarly to the video signals $V_A$ and $V_B$ shown in FIG. 4. However, a video signal b for a center picture is preferably processed so that an end portion $a_E$ of the video signal a and a start portion $b_S$ of the video signal b should have the same contents and that an end portion $b_E$ of the video signal b and a start portion $c_S$ of the video signal c should have the same contents. These portions of the video signals a, b, c are subjected to a fade-out processing and a fade-in processing. Thus, the edge portions of the projected pictures are corrected at two boundary portions generated at when the synthesized picture is obtained by synthesizing three pictures are corrected.

Figure 6:
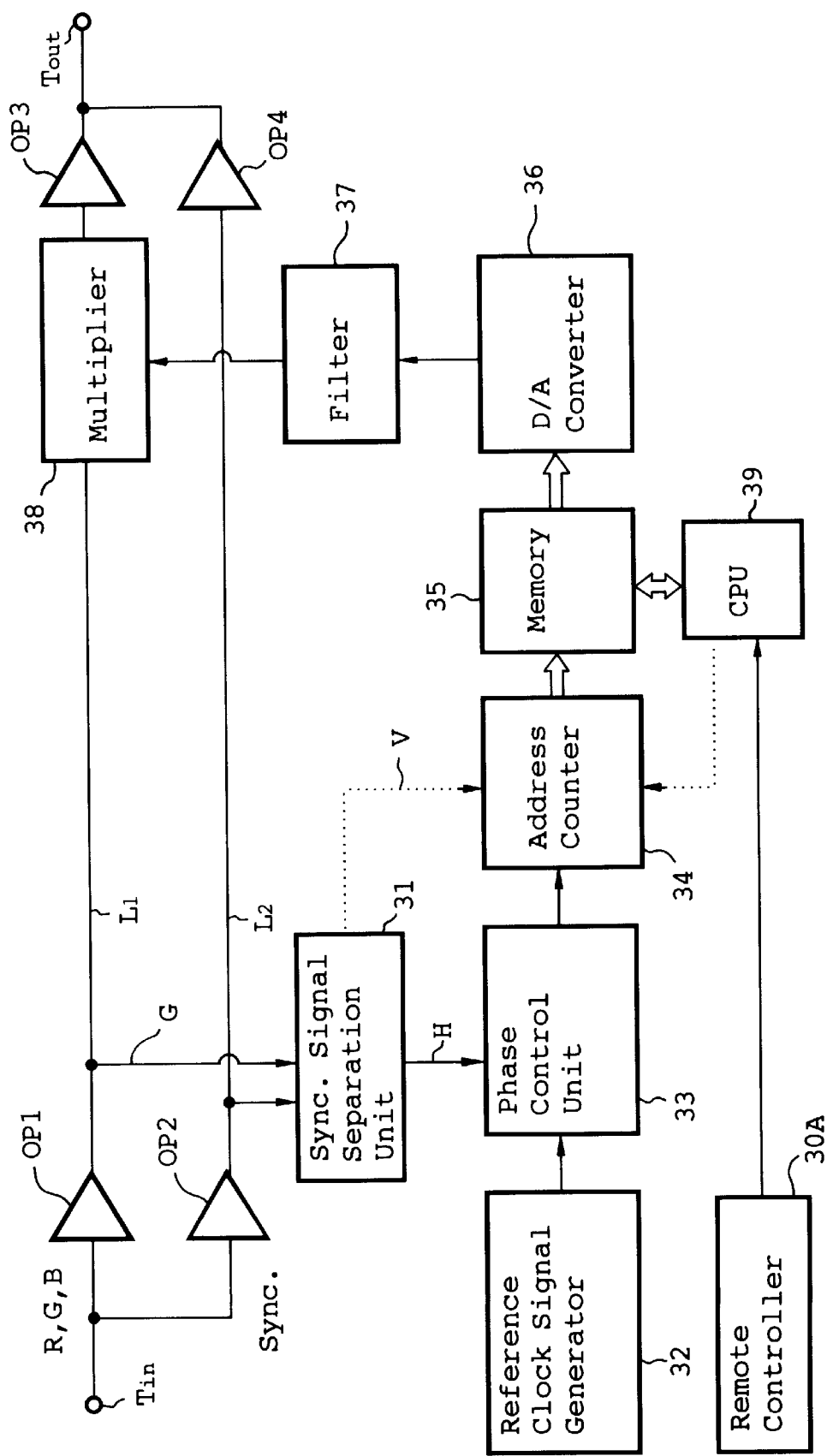
FIG. 6 is a block diagram showing a video signal processing apparatus according to the embodiment.

A main part of the SEM apparatus 30 shown in FIG. 3 will be described with reference to FIG. 6 which is a block diagram. FIG. 6 shows only a part of the SEM apparatus 30, i.e., a circuit block for processing video signals of one system.

A video-signal/synchronizing-signal input terminal $T_{in}$ is supplied with video signals from the video signal source 20 (e.g., the computer 20A, the laser disk player apparatus 20B, etc.).

As shown in FIG. 6, video signals (R, G, B component signals) input from the video-signal/synchronizing-signal input terminal $T_{in}$ are clamped by a buffer amplifier OP1 and then supplied through a line $L_1$ to a multiplier 38. The multiplier 38 adjusts luminance levels of the clamped video signals which are then output through a buffer amplifier OP3 to a video-signal/synchronizing-signal output terminal $T_{out}$. Then, the video signals output from the video-signal/synchronizing-signal output terminal $T_{out}$ is supplied to the projecting apparatus 40A, 40B, 40C which are not shown in FIG. 6.

When the synchronizing signals are already separated from the video signals and then supplied as it is carried out in a field of computer graphics or the like, the horizontal and vertical synchronizing signals H and V are supplied through a buffer amplifier OP2, a line $L_2$ and a buffer amplifier OP4 to the video-signal/synchronizing-signal output terminal $T_{out}$.

If the synchronizing signals are superposed on the video signal G, then a synchronizing signal separation unit 31 is supplied with the video signal G from the buffer amplifier OP1 and extracts the horizontal and vertical synchronizing signals H, V therefrom.

The synchronizing signal separation unit 31 supplies the extracted horizontal synchronizing signal H to a phase control unit 33 (manufactured by Krayus Co. under the tradename of KS6369). A reference clock generator 32 is formed of, for example, a crystal oscillator or the like and outputs a clock signal CLK having a fixed frequency of 40 MHz to the phase control unit 33. Every time when the phase control unit 33 is supplied with the horizontal synchronizing signal H, the phase control unit 33 synchronizes a phase of the clock signal CLK having a fixed frequency of 40 MHz with that of the input horizontal synchronizing signal H with reference to the input timing of the latter and then outputs the clock signal CLK.

An address counter 34 is a counter used for reading out data stored in a memory (RAM) 35 provided at the succeeding stage based on the clock signal supplied from the phase control unit 33. The address counter 34 is used to read out correction data of one horizontal period from the memory 35 based on 12-bit address data.

Figure 7:
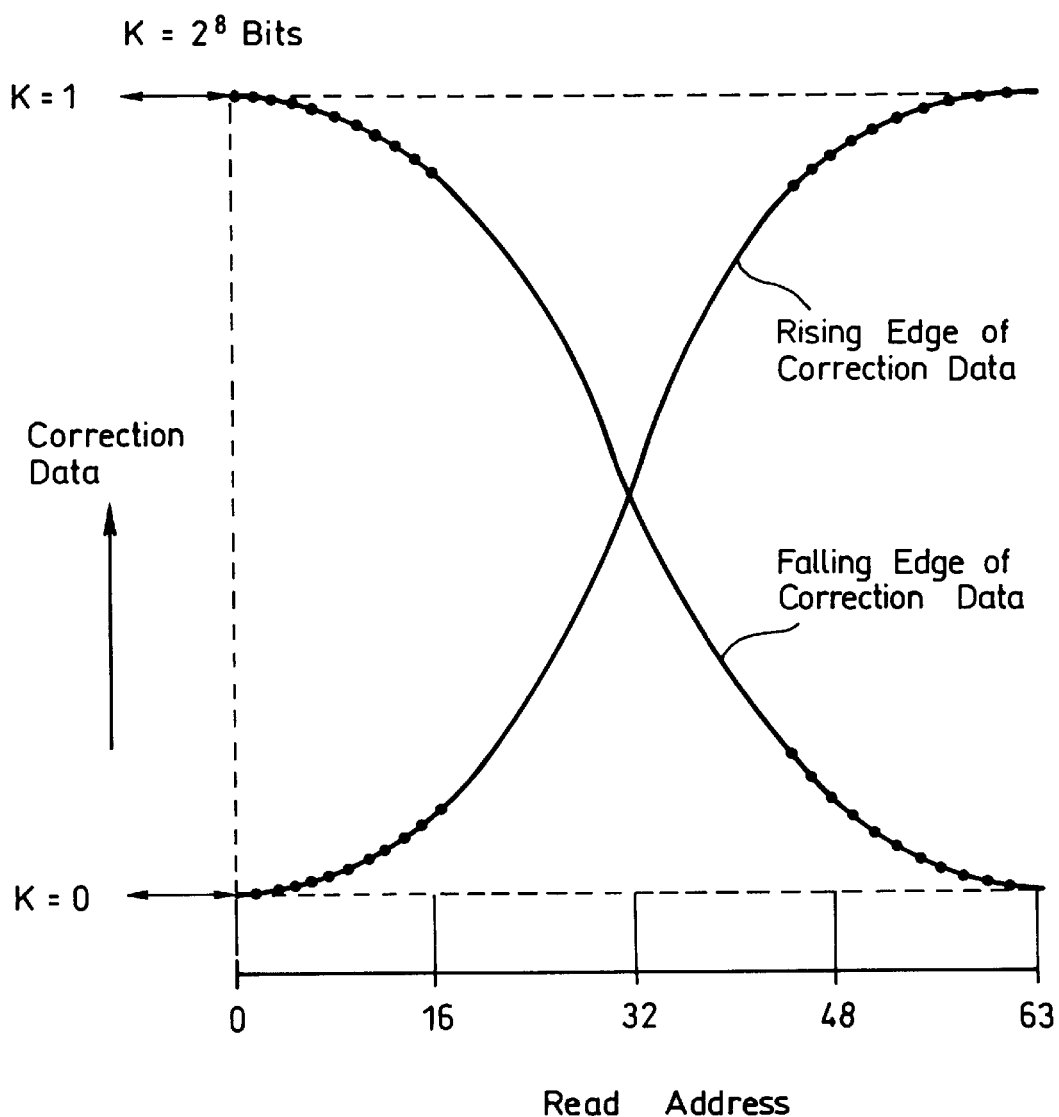
FIG. 7 is a graph showing an example of a correction data used for correcting a luminance level at an overlapped portion.

The memory 35 stores correction data which is previously set by a central processing unit (CPU) 39 and used to process the video signal corresponding to the overlapped portion Q, i.e., correction data (K=1~0) for permitting the luminance level of the video signal to gradually rise and to gradually fall like a cosine curve as shown in FIG. 7. The memory 35 outputs the correction data during a period between the correction start point S and the correction end point E shown in FIG. 4. The correction data is set as K=1 during periods other than the above period corresponding to the overlapped portion Q. While in this embodiment the above correction data is an 8-bit data and a read cycle is set to 25 ns, these values can be changed in view of a storage capacity and a price of the memory 35.

In this embodiment, since the frequency of the reference clock signal is fixed (i.e., 40 MHz), the read cycle is constant regardless of the horizontal frequency of the input video signal. Therefore, a D/A converter 36 and a filter (a smoothing filter with a cut-off frequency of 20 MHz) 37 provided at the succeeding stage can have a certain characteristic regardless of the horizontal frequency of the input video signal, which leads to simplification of the signal processing circuit.

When the video signal having the horizontal frequency of 15 KHz is input to the SEM apparatus 30, the video signal is processed with the correction data (2667 bytes) having the sampling number of about 2667 in one horizontal period. When the video signal having the horizontal frequency of 93 KHz is input thereto, the video signal is processed with the correction data (431 bytes) having the sampling number of about 431 in one horizontal period. Accordingly, in the embodiment according to the present invention, the SEM apparatus 30 includes a detection unit for detecting the horizontal frequency of the input video signal, i.e., the horizontal synchronizing frequency measuring unit 69. When the video signals of different systems are synthesized to project the synthesized picture, contents of the correction data (stored address) stored in the memory 65 are changed in accordance with the horizontal frequency of the input video signal. The correction data is always read out from the memory 35 in a constant cycle and supplied to the D/A converter 36. The D/A converter 36 converts the supplied correction data into an analog signal and supplies the analog signal to the filter 37 for smoothing the signal so that a waveform of the signal should be a smooth curve, and then supplies the analog signal to the multiplier 38. The multiplier 38 processes portions of the video signals corresponding to the overlapped portion Q (adjusts the luminance levels of the video signals).

Figure 8:
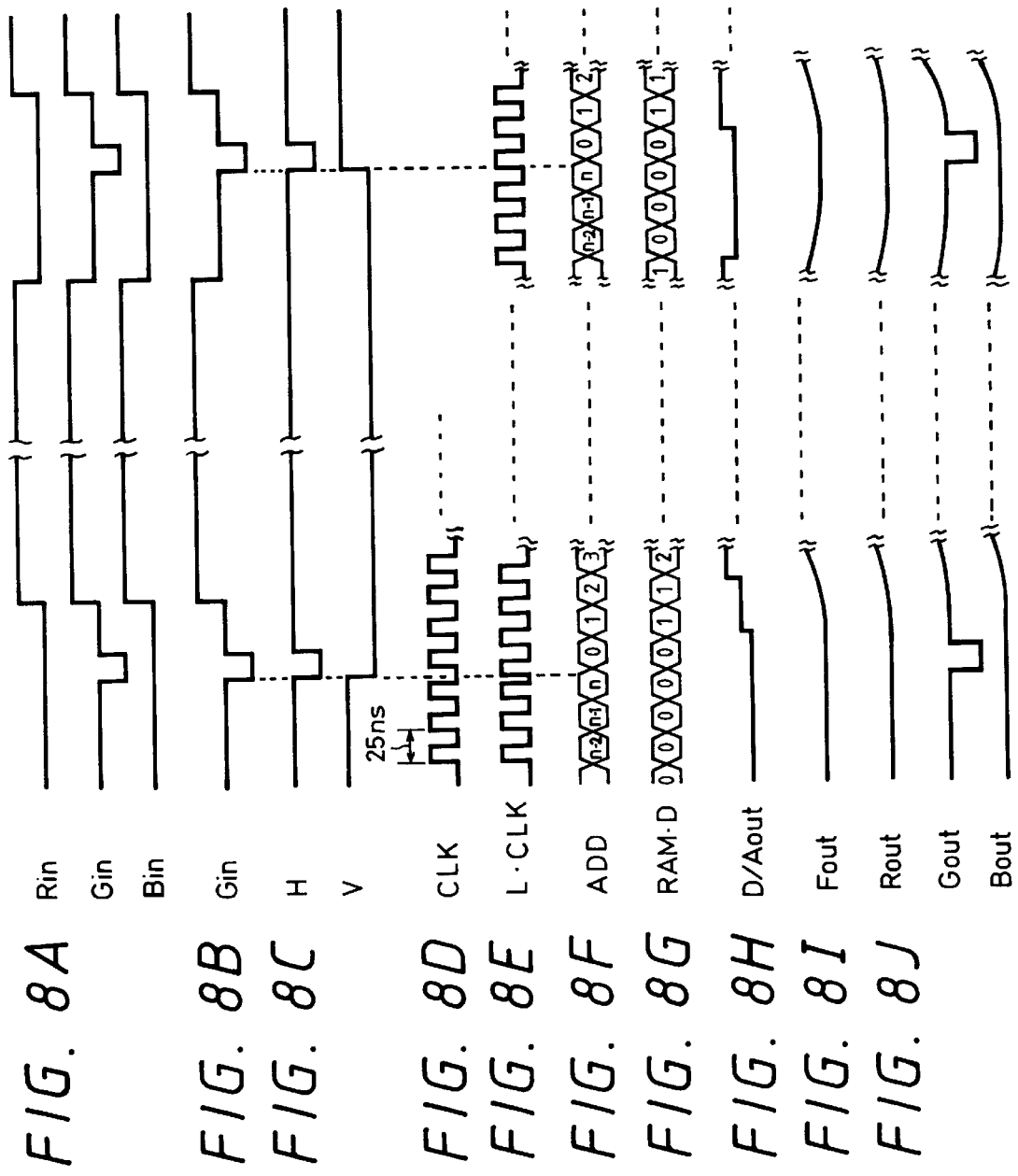
FIGS. 8A to 8J are diagrams showing waveforms of signals processed in the SEM apparatus and timings of reading the data.

FIG. 8A to 8J are diagrams showing waveforms of the signals and timings of the signal processing obtained when the R, G, B component signals as the video signals are being processed by the SEM apparatus 30 on the assumption that the synchronizing signal (the horizontal synchronizing signal) is superposed on the G component signal. FIG. 8A shows waveforms of the R, G, B component signals Rin, Gin, Bin supplied from the terminal Tin to the buffer amplifier OP1. FIG. 8B shows a waveform of the G component signal Gin supplied from the buffer amplifier OP1 to the synchronizing signal separation unit 31.

The synchronizing signal separation unit 31 separates the horizontal synchronizing signal H and the vertical synchronizing signal V from the supplied G component signal and supplies them to the phase control circuit 33 and the memory address counter 34, respectively. FIG. 8C shows waveforms of the horizontal synchronizing signal H and the vertical synchronizing signal V.

FIG. 8D shows a waveform of the clock signal CLK output from the reference clock signal generator 32. The phase control unit 33 synchronizes the clock signals CLK supplied from the reference clock signal generator 32 with the horizontal synchronizing signal H with reference to a trailing edge of the latter to thereby convert the clock signal CLK into a locked clock signal L·CLK. FIG. 8E shows a waveform of the locked clock signal L·CLK. The address counter 34 generates an address signal ADD used for reading data from the memory 35, with reference to the locked clock signal L·CLK. FIG. 8F shows a waveform of the address signal ADD. The correction data RAM·D is read out from the memory 35 based on the address signal ADD. FIG. 8G shows a waveform of the correction data RAM·D.

The correction data RAM-D is supplied to the D/A converter 36. The D/A converter 36 converts the correction data RAM·D into the analog signal (which is an output signal D/Aout of the D/A converter 36) and supplies the output signal D/Aout to the filter 37. FIG. 8H shows a waveform of the output signal D/Aout of the D/A converter 36. The filter 37 smooths the signal D/Aout and supplies an output signal Fout to the multiplier 38. FIG. 8I shows a waveform of the output signal Fout from the filter 37.

The multiplier 38 multiplies the respective input R, G, B component signals with the value (k=0~1) of the correction data RAM·D output from the memory 35, controlling the luminance signals of the video signals used for forming the synthesized picture so that amplitudes of the video signals should be faded out and faded in, respectively. The multiplier 38 outputs the multiplied R, G, B component signals Rout, Gout, Bout through the terminal Tout to the projecting apparatus. FIG. 8J shows waveforms of the multiplied R, G, B component signals Rout, Gout, Bout.

A period of the video signal corresponding to the overlapped portion Q of the synthesized picture where adjacent projected pictures are overlapped may be set to about 10 to 15% of the period of the video signal. The period corresponding to the overlapped portion Q can optionally be changed depending upon the video source. The user can designate such change by operating a remote controller 30A shown in FIG. 3.

Since an entire white picture is optimum for a test picture used for adjusting a joint portion of the synthesized picture based on the correction data so that the user cannot recognize the joint portion, the SEM apparatus (video signal processing circuit) 30 may include a test pattern signal generating apparatus for generating a test pattern signal used for displaying white on the entire screen 50.

Figure 9:
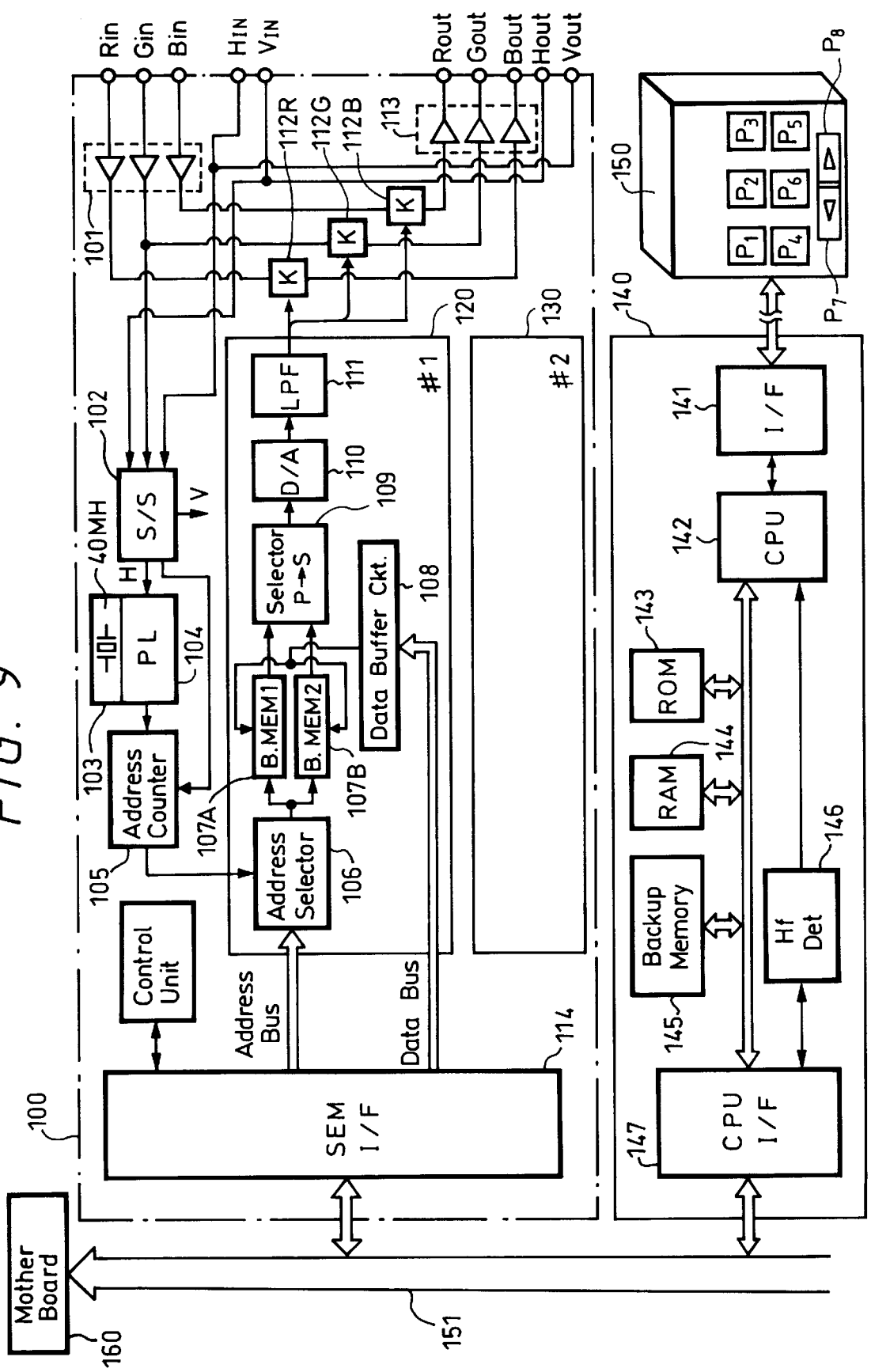
FIG. 9 is a block diagram showing an electronic circuit provided in the SEM apparatus.

FIG. 9 shows an electronic circuit on a board inserted into the SEM apparatus 30. A signal processing circuit for processing a video signal used for forming a synthesized picture is provided on one board 100.

Specifically, terminals Rin, Gin, Bin to which the R, G, B component signals are respectively input and synchronizing signal terminals Hin, Vin are provided on the board 100 surrounded by a one-dot chain line in FIG. 9. Terminals Rout, Gout, Bout, Hout and Vout from which the respective R, G, B component signals and the synchronizing signals H, V are output are provided thereon.

The input R, G, B component signals are clamped by buffer amplifiers 101 and then supplied to a synchronizing signal separation circuit (S/S) 102. The synchronizing signal separation circuit 102 separates synchronizing signals H, V from the component signals R, G, B and supplies the separated synchronizing signal H to a phase control circuit (PL) 104. The phase control circuit 104 controls a phase of a clock signal CLK having a fixed frequency of 40 MHz output from a reference clock signal generator 103 formed of a crystal oscillator or the like. The phase control circuit 104 locks the clock signal and supplies the locked clock signal to an address counter 105. The address counter 105 generates an address data of the bank memories 107A, 107B with reference to the clock signal CLK and outputs the address data to the bank memories 107A, 107B. The address data is selected by an address selector 106 in response to the horizontal synchronizing frequency of the input video signal, and the correction data are output from the bank memory 107A or 107B with an interval of a sample point of a read data being constant.

The memories of two systems for storing the correction data used for changing the level of the luminance signal are provided. For example, when the data that has been input to the bank memory 107A is changed by operating the remote controller 150, a changed data is recorded in the empty bank memory 107B. After the changed data is recorded in the memory 107B, the readings of the bank memories 107A, 107B are switched in synchronization with the vertical synchronizing signal V. Therefore, according to this embodiment, the user can correct edge portions of projected pictures to be synthesized by operating the remote controller 150 while watching the screen. Moreover, the picture projected on the screen is prevented from being disturbed during the correction of the edge portions, i.e., the correction at the overlapped portion Q.

A data buffer circuit 108 is used when the changed data is written in the bank memory 107A or 107B, e.g., when the changed data is written therein in cooperation with the address selector 106 and when the changed data is stored therein. The switching of the bank memories 107A and 107B and data conversion (parallel-to-serial conversion) are controlled by a bank memory selector 109, whose output digital data is supplied to a D/A converter 110. The D/A converter 110 converts the digital data into an analog signal and supplies the analog signal to a filter (LPF) 111.

The filter 111 smooths the supplied analog signal and supplies the analog correction signal to coefficient multipliers 112R, 112G, 112B. The coefficient multipliers 112R, 112G, 112B allows the R, G, B component signals to have characteristics of proper rising and falling edges.

A board 130 is provided in order to provide a preparatory electronic circuit. The board 130 can be used for provision of a circuit for supplying to the coefficient multipliers 112R, 112G, 112B correction data used for a signal processing for correcting a color shift (change of a hue of a color signal), a hot spot or the like produced upon the projection depending upon the video signal.

A board 140 is mounted with a remote-controller interface (I/F) 141 used for changing the correction data based on a command from the remote controller 150 connected thereto in accordance with a communication protocol of RC-232C and for adjusting the edge portions of the projected pictures so that the user cannot recognize the edge portions on the screen. The command from the remote controller 150 is supplied from the remote-controller interface 141 to a central processing unit (CPU) 142. The CPU 142 analyzes the command and controls the above various operations of the circuits on the board 120 through a CPU interface 147. A memory (ROM) 143, a memory (RAM) 144 and a backup memory 145 for storing an operation program of the CPU 142, a cosine curve data for fade-in and fade-out characteristics and so on are provided on the board 140.

Particularly, the backup memory 145 stores several kinds of optimum correction data which have been set for various video signals. When, for example, the video signals of different video sources are synthesized to display a synthesized picture, if the horizontal frequency of the video signal has already been detected and data set for the synthesized picture in response to the frequency has already been stored in the backup memory 145, then a horizontal synchronizing frequency measuring unit (Hf DET) 146 detects a horizontal synchronizing frequency of a newly input video signal and generates an interruption directly to the CPU 142. The CPU 142 reads out an optimum data used when the synthesized picture is projected, from the backup memory 145 and transfers the optimum data to the bank memory 107A or 107B on the board 120.

The boards 100, 140 shown in FIG. 9 are arranged so as to be detachably attached to the SEM apparatus 30 shown in FIG. 3 up to the number of the video signals for pictures to be synthesized. The respective attached boards 100, 140 are totally controlled by a main CPU (not shown) provided in a mother board 160 through a main bus 151. The SEM remote controller 150 is provided with buttons P1, P2, P3 used for selecting the video signals for the pictures to be synthesized, buttons P4, P5 used for selecting characteristics of rising and falling edges of the video signals corresponding to the overlapped portion Q on the screen, a button P6 used for selecting a width of the overlapped portion Q on the screen, and buttons P7 and P8 used for selecting a direction in which the edge portion of the projected picture is moved. When the user operates these buttons P1 to P8, the main CPU receives a reception signal from the SEM apparatus side. When the user operates the buttons P4, P5, the main CPU easily and gradually changes the correction data for correcting the edge portion on the projected picture to process the video signals so that a viewer cannot recognize a boundary between the edge portions of the projected pictures.

While in this embodiment data indicative of the luminance level changed like a cosine curve is used as the correction data which permits the viewer to recognize that the pictures obtained from the video signals are continuous at the overlapped portion Q, the present invention is not limited thereto and the luminance level indicated by the correction data may be changed like other curve or linearly.

The video signal processing apparatus according to the present invention can be modified and changed without departing from a gist of the present invention. For example, when a field memory is used as the memory for storing the correction data and the data is read out therefrom with reference to the horizontal synchronizing signal, then it is possible to correct the edge portions of the projected pictures which are located in the vertical direction.

As described above, according to the video signal processing apparatus of the present invention, the synchronization information of the input video signal is extracted and the high-accuracy reference clock signal generator 32 formed of a crystal oscillator or the like generates the clock signal CLK having a phase synchronized with that of the synchronizing signal, thereby a sampling cycle for outputting the correction data being set constant regardless of the horizontal synchronizing frequency of the video signal. Therefore, the video signal processing apparatus can have a simple circuit arrangement and can carry out a stable signal processing.

Moreover, since the synthesized-picture projecting apparatus is formed such that the video signal corresponding to the overlapped portion on the screen should be processed, it is possible to project the synthesized picture on a large size screen with ease.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A video signal processing apparatus comprising:

a synchronizing signal separation means for extracting a synchronization information of an input video signal;

a reference clock signal source for generating a signal having a constant period;

a phase synchronization control means which is input with a clock signal output from the said reference clock signal source and which outputs a phase-locked clock signal at a timing of outputting said synchronization information; and a memory means for storing a correction data used for correcting a video signal of at least one scanning line amount, wherein said correction data is a data used for correcting a signal corresponding to an overlapped portion produced when pictures obtained from said input video signals are synthesized to form a synthesized picture, and wherein said correction data is read out from said memory means based on said clock signal output from said chase synchronization control means to process said input video signal.

2. A video signal processing apparatus comprising:

a synchronizing signal separation means for extracting a synchronization information of an input video signal;

a reference clock signal source for generating a signal having a constant period;

a phase synchronization control means which is input with a clock signal output from the said reference clock signal source and which outputs a phase-locked clock signal at a timing of outputting said synchronization information; and a memory means for storing a correction data used for correcting a video signal of at least one scanning line amount, wherein said correction data is a data which permits a luminance level of said video signal of one horizontal scanning line amount to be faded in and/or faded out at a start portion and/or an end portion thereof linearly or like a predetermined curve, and wherein said correction data is read out from said memory means based on said clock signal output from said phase synchronization control means to process said input video signal.

3. A synthesized-picture projecting apparatus comprising:

a video signal processing apparatus formed of a synchronizing signal separation means for extracting a synchronization information of an input video signal, a reference clock signal source for generating a signal having a constant period, a phase synchronization control means which is input with a clock signal output from the said reference clock signal source and which outputs a phase-locked clock signal at a timing of outputting said synchronization information, a memory means for storing a correction data used for correcting a video signal of at least one scanning line amount, and a control means for reading out said correction data from said memory means based on said clock signal output from said phase synchronization control means and for processing said video signals corresponding to edge portions of projected pictures, said video signal processing apparatus being supplied with two video signals or more for forming synthesized projected picture to process video signals corresponding to an overlapped portion of said synthesized picture; and two projecting apparatus or more for projecting on a screen pictures obtained from video signals output from said video signal processing apparatus.

* * * * *